United States Patent
Nakagawa et al.

(10) Patent No.: US 10,701,281 B2
(45) Date of Patent: Jun. 30, 2020

(54) IMAGE PROCESSING APPARATUS, SOLID-STATE IMAGING DEVICE, AND ELECTRONIC APPARATUS

(71) Applicant: SONY CORPORATION, Tokyo (JP)

(72) Inventors: Takaaki Nakagawa, Kanagawa (JP); Hiromasa Doi, Kanagawa (JP); Rio Yamasaki, Tokyo (JP); Hideo Okamoto, Kanagawa (JP); Kazuhiro Kondo, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/754,026

(22) PCT Filed: Aug. 26, 2016

(86) PCT No.: PCT/JP2016/003886
§ 371 (c)(1),
(2) Date: Feb. 21, 2018

(87) PCT Pub. No.: WO2017/043031
PCT Pub. Date: Mar. 16, 2017

(65) Prior Publication Data
US 2018/0249090 A1    Aug. 30, 2018

(30) Foreign Application Priority Data

Sep. 9, 2015    (JP) .................... 2015-177294

(51) Int. Cl.
*H04N 5/225* (2006.01)
*H04N 5/262* (2006.01)
(Continued)

(52) U.S. Cl.
CPC ....... *H04N 5/2621* (2013.01); *G06K 9/00664* (2013.01); *G06T 5/002* (2013.01);
(Continued)

(58) Field of Classification Search
None
See application file for complete search history.

(56) References Cited

U.S. PATENT DOCUMENTS

| 2012/0327172 | A1* | 12/2012 | El-Saban | ........... | G06K 9/00228 348/14.02 |
| 2013/0169760 | A1 | 7/2013 | Watts | | |

(Continued)

FOREIGN PATENT DOCUMENTS

| JP | 2009-239903 A | 10/2009 |
| JP | 2012-065048 A | 3/2012 |

(Continued)

OTHER PUBLICATIONS

International Search Report and Written Opinion of PCT Application No. PCT/JP2016/003886, dated Nov. 17, 2016, 10 pages.
Office Action for JP Patent Application No. 2015-177294, dated Jun. 27, 2019, 05 pages of Office Action and 04 pages of English Translation.

* cited by examiner

*Primary Examiner* — Twyler L Haskins
*Assistant Examiner* — Dwight Alex C Tejano
(74) *Attorney, Agent, or Firm* — Chip Law Group

(57) ABSTRACT

Image processing device and method for processing images captured at different times. The method may comprise determining a location of a first area in a first image, determining in a second image captured at a different time than the first image, a location of a second area, wherein the first area and the second area include a same object, and determining a new background area in the second image based on the location of the first area and the location of the second area, wherein the new background area includes a portion of the second image included in the first area but not included in the second area.

15 Claims, 11 Drawing Sheets

(51) Int. Cl.
*G09G 5/00* (2006.01)
*H04N 5/232* (2006.01)
*G06T 7/215* (2017.01)
*G06T 7/194* (2017.01)
*G06T 7/557* (2017.01)
*G06K 9/00* (2006.01)
*G06T 5/00* (2006.01)
*H04N 5/374* (2011.01)

(52) U.S. Cl.
CPC ............. *G06T 7/194* (2017.01); *G06T 7/215* (2017.01); *G06T 7/557* (2017.01); *G09G 5/00* (2013.01); *H04N 5/23222* (2013.01); *H04N 5/23229* (2013.01); *H04N 5/374* (2013.01); *G06T 2207/10016* (2013.01); *G09G 2320/0261* (2013.01); *G09G 2320/103* (2013.01); *G09G 2340/14* (2013.01)

(56) References Cited

U.S. PATENT DOCUMENTS

| | | | |
|---|---|---|---|
| 2014/0192199 A1* | 7/2014 | Tan | H04N 21/2187 348/159 |
| 2014/0233853 A1* | 8/2014 | Fransson | G06K 9/60 382/173 |
| 2014/0307044 A1* | 10/2014 | Sharma | H04N 5/23229 348/36 |
| 2015/0187083 A1* | 7/2015 | Yoon | H04N 5/23212 382/106 |
| 2016/0073055 A1* | 3/2016 | Marsh | H04N 7/152 348/14.08 |

FOREIGN PATENT DOCUMENTS

| | | |
|---|---|---|
| JP | 2012-203657 A | 10/2012 |
| JP | 2015-079519 A | 4/2015 |
| JP | 2015-082801 A | 4/2015 |
| JP | 2015-109497 A | 6/2015 |
| JP | 2015-144339 A | 8/2015 |

FIG. 2
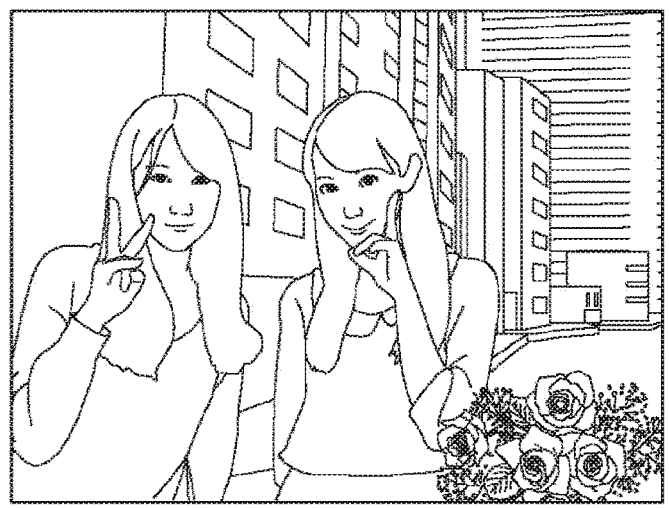
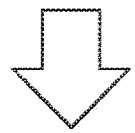
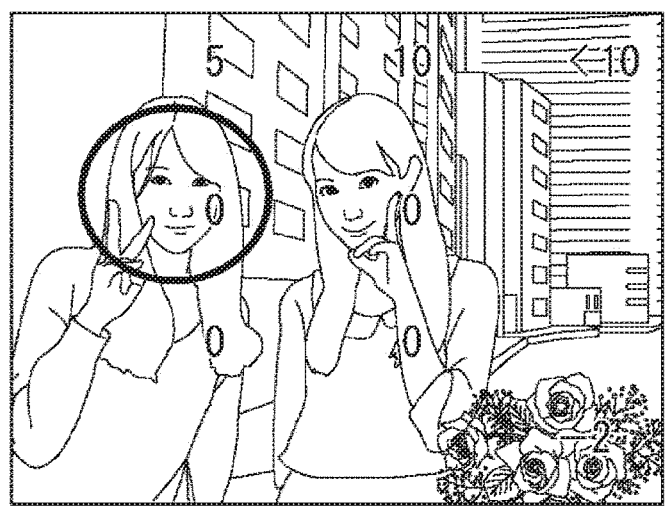

FIG. 6
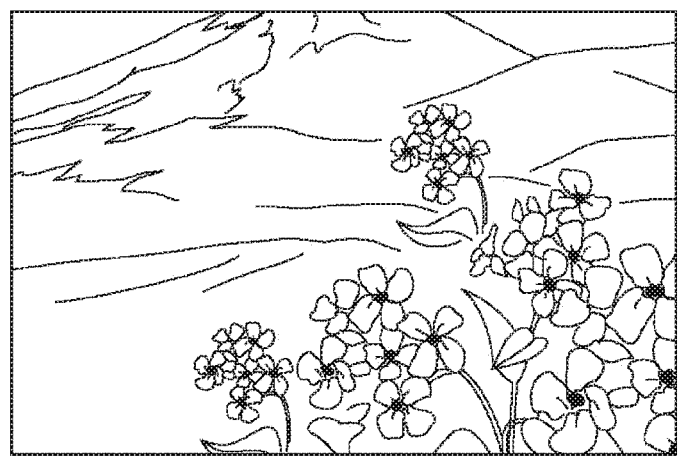
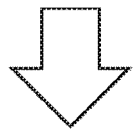
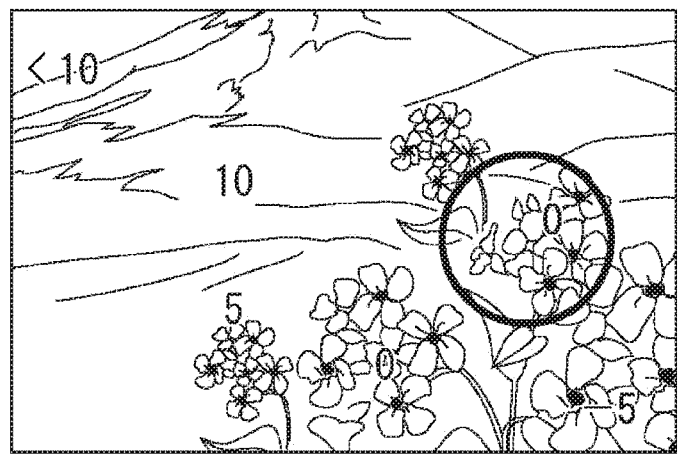

FIG. 8
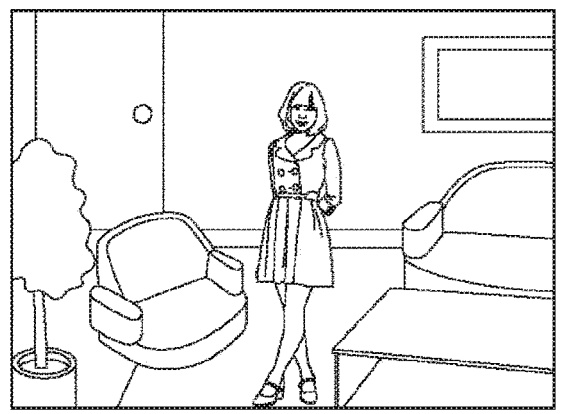
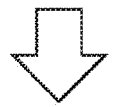
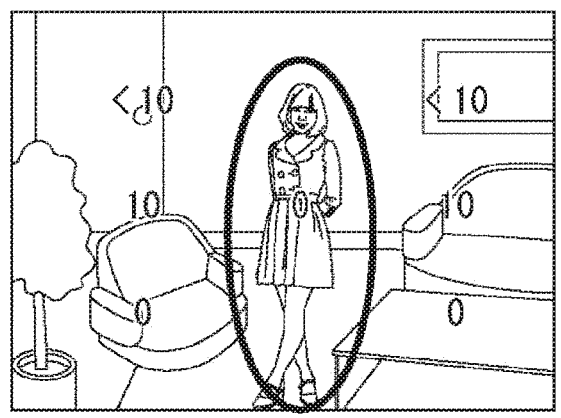
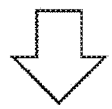
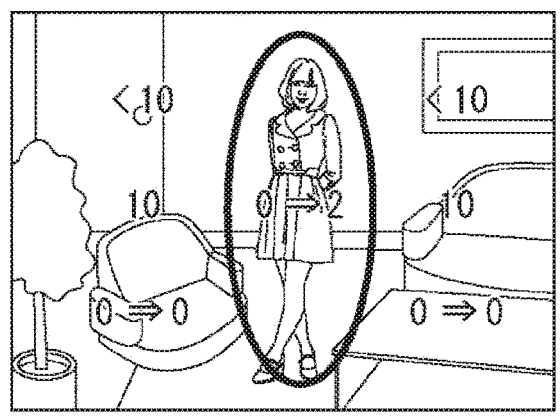

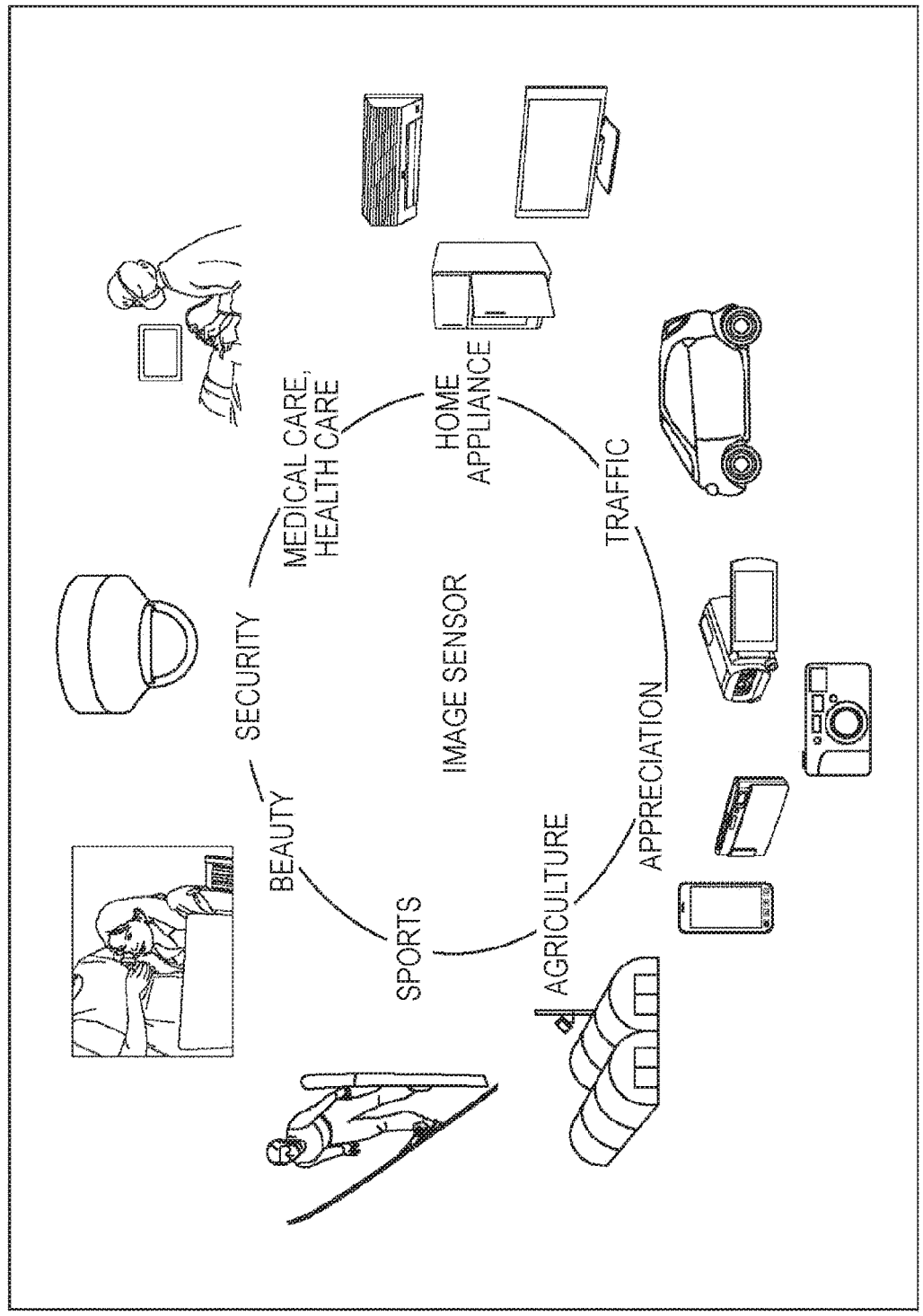

IMAGE PROCESSING APPARATUS, SOLID-STATE IMAGING DEVICE, AND ELECTRONIC APPARATUS

CROSS REFERENCE TO RELATED APPLICATIONS

This application is a U.S. National Phase of International Patent Application No. PCT/JP2016/003886 filed on Aug. 26, 2016, which claims the priority benefit of Japanese Patent Application No. JP 2015-177294 filed in the Japan Patent Office on Sep. 9, 2015. Each of the above-referenced applications is hereby incorporated herein by reference in its entirety.

TECHNICAL FIELD

The present disclosure relates to an image processing apparatus, a solid-state imaging device, and an electronic apparatus, and more particularly, to an image processing apparatus, a solid-state imaging device, and an electronic apparatus capable of performing an image process at a higher speed.

BACKGROUND ART

In recent years, there has been increased use of service (so-called Internet live broadcast or video broadcast) where general photographing persons who do not work in broadcasting business deliver moving pictures obtained by imaging themselves in real time by using a streaming technique or the like.

In general, in case of performing imaging mainly persons such as a 'selfie' or a portrait, an imaging scheme where only the persons are focused and background is blurred is preferentially used. In the related art, such an imaging scheme has been employed in professional movie photographing or drama photographing, and highly expensive instruments, single-lens reflex cameras, or the like have been necessary.

Therefore, there have been proposed schemes of changing blur mood or a focused position after the imaging by performing an image process using measurement information mainly with respect to a still image. For example, PTL 1 discloses a scheme of generating a focused image where a portion corresponding to a position indicated by user's finger, a touch pen, or the like is focused with respect to a captured image based on measurement information.

CITATION LIST

Patent Literature

[PTL 1]
JP 2015-79519 A

SUMMARY

Technical Problem

As described above, although the image process of changing the blur mood or the focused position after the imaging with respect to a still image has been performed in the related art, it has been difficult to apply the same image process to a moving picture. For example, in case of performing the image process on a moving picture, a position which is desired to be focused needs to be set for every one frame by input manipulation, and thus, it is difficult to secure a sufficient processing speed for performing the image process of blurring a portion other than the subject which is desired to be focused in real time. In addition, a calculation process at the next stage of calculating a depth map for every one frame with respect to the moving picture is increased, and thus, it is difficult to perform the calculation process in real time.

The present disclosure is to perform an image process at a higher speed.

In some embodiments, an image processing device may comprise a storage device configured to store a first image and a second image captured at different times, wherein the first image and the second image include a same object and a computer processor programmed to determine a location of a first area in the first image, wherein the first area includes the object, determine a location of a second area in the second image, wherein the second area includes the object, and determine a new background area in the second image based on the location of the first area and the location of the second area, wherein the new background area includes a portion of the second image included in the first area but not included in the second area.

In some embodiments, an image processing method may comprise determining, by at least one computer processor, a location of a first area in a first image, determining in a second image captured at a different time than the first image, a location of a second area, wherein the first area and the second area include a same object, and determining a new background area in the second image based on the location of the first area and the location of the second area, wherein the new background area includes a portion of the second image included in the first area but not included in the second area.

In some embodiments, an image capturing system may comprise an image sensor configured to convert incident light to an electronic signal to form image data, at least one lens arranged to focus incident light onto a light-incident surface of the image sensor, and signal processing circuitry arranged to receive the image data from the image sensor and configured to process the image data. The signal processing circuitry may comprise a storage device configured to store a first image and a second image received from the image sensor, wherein the first image and the second image include a same object, and a computer processor programmed to determine a location of a first area in the first image, wherein the first area includes the object, determine a location of a second area in the second image, wherein the second area includes the object, and determine a new background area in the second image based on the location of the first area and the location of the second area, wherein the new background area includes a portion of the second image included in the first area but not included in the second area.

The foregoing summary is provided by way of illustration and is not intended to be limiting.

Advantageous Effects

According to an aspect of the present disclosure, it is possible to perform an image process at a higher speed.

BRIEF DESCRIPTION OF DRAWINGS

FIG. 2 is a diagram for explaining an image process.

FIG. 6 is a diagram for explaining an image process.

FIG. 8 is a diagram for explaining an image process.

FIG. 11 is a diagram illustrating use examples using an image sensor.

DESCRIPTION OF EMBODIMENTS

Hereinafter, exemplary embodiments of the present technology will be described in detail with reference to the drawings.

<First Embodiment of Solid-State Imaging Device>

Figure 1:
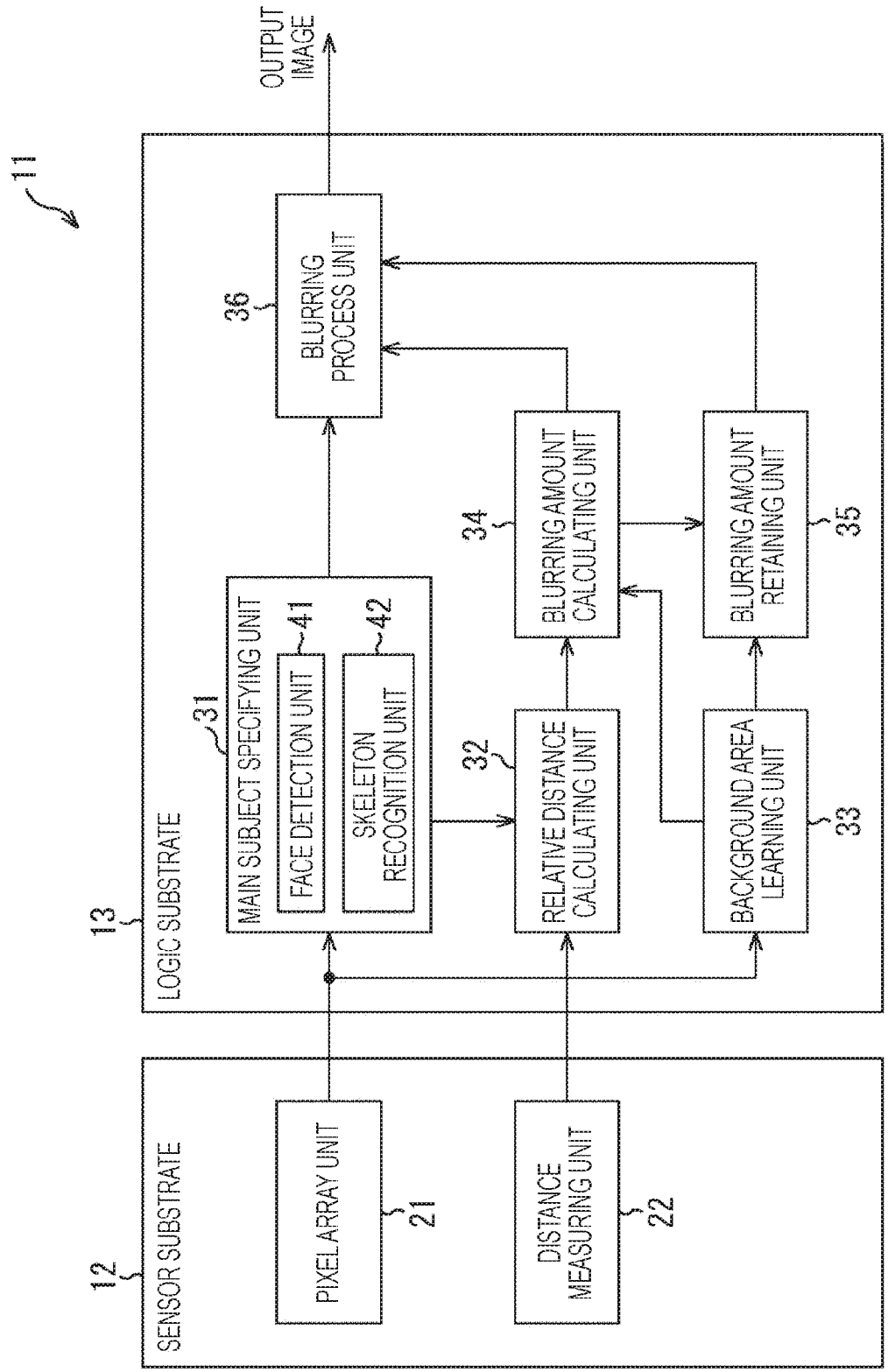
FIG. 1 is a block diagram illustrating a configuration example of a first embodiment of a solid-state imaging device according to an aspect of the present technology.

FIG. 1 is a block diagram illustrating a configuration example of a first embodiment of a solid-state imaging device according to an aspect of the present technology.

In FIG. 1, the solid-state imaging device 11 is a stacked Complementary Metal Oxide Semiconductor (CMOS) image sensor where a sensor substrate 12 and a logic substrate 13 are configured to be stacked electrically and mechanically. The solid-state imaging device 11 outputs an output image obtained by performing an image process in the logic substrate 13 on an image captured in the sensor substrate 12 to a signal processing circuit (not shown) at the rear stage thereof.

The sensor substrate 12 is configured to include an pixel array unit 21 and a distance measuring unit 22, and the logic substrate 13 is configured to include a main subject specifying unit 31, a relative distance calculating unit 32, a background area learning unit 33, a blurring amount calculating unit 34, a blurring amount retaining unit 35, and a blurring process unit 36.

The pixel array unit 21 is an imaging unit where a plurality of pixels is arranged in an array shape, and an image of a subject is formed on the pixel array unit through an optical system (not shown). The pixel array unit 21 supplies an image captured based on light-receiving amounts of the pixels for a predetermined exposure time to the main subject specifying unit 31 and the background area learning unit 33 of the logic substrate 13. In addition, the pixel array unit 21 can image a moving picture by capturing images at a predetermined frame rate, and the images continuously output from the pixel array unit 21 are sequentially set as process targets, on which the image process in the logic substrate 13 is performed. In addition, in an imaging apparatus equipped with the solid-state imaging device 11, an optical system having a deep depth of field (for example, an aperture of a lens is large) is used so that the image captured by the pixel array unit 21 is focused in a wide range inward from the front.

The distance measuring unit 22 measures a distance (hereinafter, appropriately referred to as a subject distance) to the subject photographed on the image for every one frame of the moving picture captured by the pixel array unit 21 and supplies the subject distance over the entire surface of the image to the relative distance calculating unit 32 of the logic substrate 13. For example, the distance measuring unit 22 may be configured so that phase difference pixels measuring the subject distance based on a phase difference of light collected by an optical system (not shown) are arranged to substitute for a portion of pixels of the pixel array unit 21. In addition, the distance measuring unit 22 may be configured so that a light-emitting unit (not shown) outputs an infrared ray in a pulse form toward the subject and a light-receiver receives an infrared ray reflected on the subject, and thus, the distance measuring unit can measure the subject distance based on a timing of receiving the infrared ray. Otherwise, as the distance measuring unit 22, a stereo camera using a plurality of imaging units may be employed, and a method of measuring the subject distance by the distance measuring unit 22 is not limited to a specific technique.

The main subject specifying unit 31 specifies a main subject area where a main subject, which is a to-be-focused subject among the subjects photographed on the image, is photographed for every one frame of the moving picture supplied from the pixel array unit 21 and supplies the main subject area to the relative distance calculating unit 32.

For example, the main subject specifying unit 31 is configured to include a face detection unit 41 and a skeleton recognition unit 42. The face detection unit 41 detects faces photographed on the image and specifies a person whose face is photographed to have the largest size on the image as the main subject and sets the main subject area. In addition, the skeleton recognition unit 42 recognizes skeleton of the person specified as the main subject by the face detection unit 41 and sets the main subject area so that an area where a body of the person is photographed is included and an area where an object held by a hand of the person is photographed is included.

The relative distance calculating unit 32 calculates relative distance information indicating relative distances with respect to subjects other than the main subject by setting the subject distance in the main subject area specified by the main subject specifying unit 31 as a reference, based on the subject distances over the entire surface of the image supplied from the distance measuring unit 22. Herein, hereinafter, among the areas other than the subject area of the image, an area where a subject located at a position farther than the main subject is photographed is referred to as a background area, and an area where a subject located at a position closer than the subject is photographed is referred to as a foreground area.

For example, the relative distance calculating unit 32 calculates the relative distance information of the relative distance to the subject photographed in the background area to be a plus value by setting the subject distance of the main subject area as a reference and calculates the relative distance information of the relative distance to the subject photographed in the foreground area to be a minus value. The relative distance calculating unit 32 supplies the calculated relative distance information to the blurring amount calculating unit 34.

The background area learning unit 33 performs learning using the moving picture supplied from the pixel array unit 21 and recognizes the background area, for example, based on a difference between frames of the moving picture. Namely, if images of one frame are supplied from the pixel array unit 21, the background area learning unit 33 obtains a motion of the subject based on a difference between a process-target image and a specific image (for example, a one-frame preceding image) set as a process target before the image. The background area learning unit 33 recognizes an area where the motion of the subject is equal to or smaller than a predetermined magnitude (including no motion of the subject) as the background area.

In addition, the background area learning unit 33 sets an area recognized as the background area in the current frame continually from the preceding frame as a continual background area. In addition, the background area learning unit 33 sets an area which is newly recognized as a background area in the current frame as a new background area. In addition, the background area learning unit 33 sets an area which is recognized as a background area in the preceding frame but is excluded from the background area in the current frame as an excluded background area.

The background area learning unit 33 performs instructing the blurring amount calculating unit 34 to stop calculating of a blurring amount with respect to the continual background area and performs instructing the blurring amount retaining unit 35 to supply the retained blurring amount to the blurring process unit 36. In addition, the background area learning unit 33 performs instructing the blurring amount calculating unit 34 to supply a blurring amount with respect to the new background area obtained by the blurring amount calculating unit 34 to the blurring amount retaining unit 35 to be retained. In addition, the background area learning unit 33 performs instructing the blurring amount retaining unit 35 to discard the retained blurring amount with respect to the excluded background area.

The blurring amount calculating unit 34 performs calculation of obtaining a blurring amount indicating a magnitude of blur in the output image generated by the blurring process unit 36 with respect to a blurring amount calculation target area based on the relative distance information supplied from the relative distance calculating unit 32 and supplies the blurring amount to the blurring process unit 36. Herein, the blurring amount calculation target area denotes an area which is a target of performing of calculation of the blurring amount in the image captured by the pixel array unit 21.

For example, the blurring amount calculating unit 34 sets an area excluding the main subject area, the area where the subject located in the distance equal to that of the main subject (relative distance information is a specified value or less) is photographed, and the area recognized as the continual background area in the background area learning unit 33 as the blurring amount calculation target area. Namely, the blurring amount calculating unit 34 does not perform calculation of obtaining the blurring amount with respect to the main subject area, the area where the subject located in the distance equal to that of the main subject is photographed, and the area recognized as the continual background area in the background area learning unit 33. In addition, the blurring amount calculating unit 34 supplies the blurring amount of the area recognized as the new background area in the background area learning unit 33 among the obtained blurring amounts to the blurring amount retaining unit 35 to be retained.

The blurring amount retaining unit 35 retains the blurring amount supplied from the blurring amount calculating unit 34 and supplies the blurring amount of the area recognized as the continual background area by the background area learning unit 33 to the blurring process unit 36. In addition, the blurring amount retaining unit 35 discards the blurring amount of the area recognized as the excluded background area by the background area learning unit 33.

The blurring process unit 36 generates an output image obtained by blurring the background area and the foreground area of the image captured by the pixel array unit 21 which is supplied through the main subject specifying unit 31 based on the blurring amount supplied from the blurring amount calculating unit 34 and the blurring amount supplied from the blurring amount retaining unit 35 and outputs the output image. For example, the blurring process unit 36 performs an image process of blurring the background area and the foreground area of the image according to a magnitude corresponding to a relative distance to the main subject by applying a Gaussian filter (moving average filter).

As described above, in the solid-state imaging device 11, since the background area is recognized by the background area learning unit 33, the calculation of the blurring amount by the blurring amount calculating unit 34 may not be allowed to be performed on the area continually recognized as the background area. In this manner, since the calculation by the blurring amount calculating unit 34 is reduced, the solid-state imaging device 11 can perform the image process in the logic substrate 13 at a higher speed. Therefore, the solid-state imaging device 11 can generate an elegant output image where the background area and the foreground area for the main subject are blurred with respect to the image continually output from the sensor substrate 12 and can preview the output image in real time.

In addition, in the solid-state imaging device 11, since the main subject is specified by the main subject specifying unit 31, the output image where a desired subject is focused can be generated, for example, without manipulating input of a to-be-focused subject for every one frame. In addition, the solid-state imaging device 11 can generate an output image where only the main subject is focused besides, a subject existing together with the main subject, an object held by the hand of the main subject, and the like are not blurred.

Herein, the image process performed in the logic substrate 13 of the solid-state imaging device 11 will be described with reference to FIG. 2.

When an image illustrated in the upper side of FIG. 2 is captured by the pixel array unit 21, the main subject specifying unit 31 specifies a person whose face is photographed to have the largest size as the main subject by the face detection unit 41. For example, in an image of the lower side of FIG. 2, the face of a person specified as the main subject by the main subject specifying unit 31 is caught by a circle, and the relative distance calculating unit 32 calculates the relative distance information of the subject photographed on the image by using the subject distance of the main subject as a reference.

Namely, as illustrated in the image of the lower side of FIG. 2, the relative distance information of a person existing together with the person of the main subject is obtained to be 0. In addition, the relative distance information of buildings photographed in the background area is obtained to be 5, 10, and <10 (10 or more) based on the subject distances to the buildings. In addition, the relative distance information of a flower photographed in the foreground area in the lower right portion of the image is obtained to be −2 based on the subject distance to the flower.

Herein, the blurring amount calculating unit 34 sets the area where the subject of which the relative distance information is obtained to be 0 (including a value equal to or less than a specified value of which the relative distance information is close to 0) is photographed not to be included in the blurring amount calculation target area and does not perform calculation of obtaining the blurring amount.

In addition, for example, in the case where the solid-state imaging device 11 is fixed, it is considered that the subject distance to the subject photographed in the background area is not changed. Therefore, the blurring amount calculating unit 34 sets the area recognized as the continual background area by the background area learning unit 33 not to be included in the blurring amount calculation target area and generates the output image where the continual background area is blurred by using the blurring amount retained in the blurring amount retaining unit 35.

In this manner, in the solid-state imaging device 11, since the blurring amount of the area which is maintained continually as the background area is typically retained in the blurring amount retaining unit 35, the calculation process for each frame can be reduced.

Figure 3:
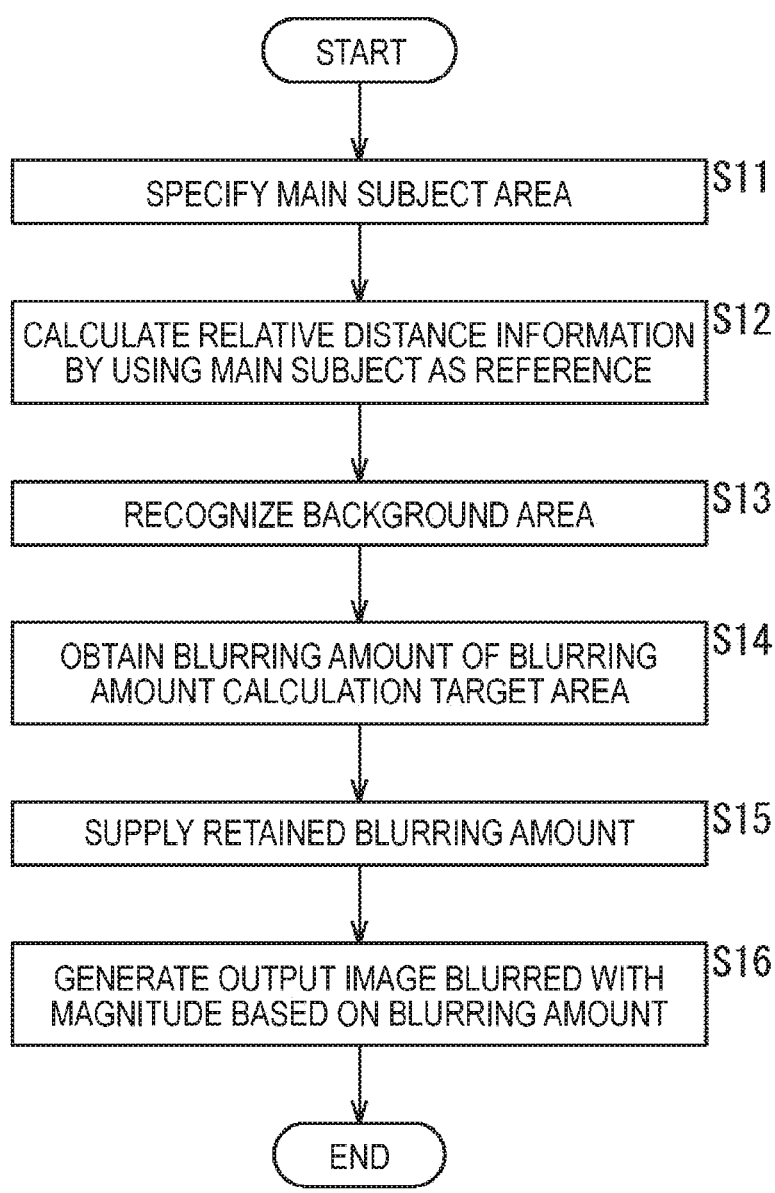
FIG. 3 is a flowchart for explaining an image process.

Next, FIG. 3 is a flowchart for explaining the image process performed in the logic substrate 13 of the solid-state imaging device 11.

For example, when a moving picture is captured in the pixel array unit 21 and images of one frame of the moving picture are supplied to the logic substrate 13, the process is started. In step S11, the main subject specifying unit 31 specifies the main subject area based on the face and skeleton of the subject photographed in the image and supplies the specified main subject area to the relative distance calculating unit 32.

In step S12, the relative distance calculating unit 32 calculates the relative distance information by using the subject distance in the main subject area supplied from the main subject specifying unit 31 in step S11 as a reference based on the subject distance supplied from the distance measuring unit 22 and supplies the relative distance information to the blurring amount calculating unit 34.

In step S13, the background area learning unit 33 recognizes the background area based on the difference between frames of the moving picture supplied from the pixel array unit 21. In addition, the background area learning unit 33 specifies the continual background area, the new background area, and the excluded background area based on comparison with the background area recognized in the one-frame preceding image.

In step S14, the blurring amount calculating unit 34 performs calculation of obtaining the blurring amount of the blurring amount calculation target area according to the relative distance information supplied from the relative distance calculating unit 32 in step S12 and supplies the obtained blurring amount to the blurring process unit 36. At this time, as described above, the calculation of obtaining the blurring amount is not performed on the main subject area, the area where the subject located in the distance equal to that of the main subject is photographed, and the area recognized as the continual background area by the background area learning unit 33. In addition, the blurring amount calculating unit 34 supplies the blurring amount of the area recognized as the new background area by the background area learning unit 33 to the blurring amount retaining unit 35.

In step S15, the blurring amount retaining unit 35 supplies the blurring amount of the area recognized as the continual background area by the background area learning unit 33 in step S13 to the blurring process unit 36. In addition, the blurring amount retaining unit 35 retains the blurring amount supplied from the blurring amount calculating unit 34 in step S14 and discards the blurring amount of the area recognized as the excluded background area by the background area learning unit 33 in step S13.

In step S16, the blurring process unit 36 generates an output image where the background area and the foreground area are blurred with respect to the image captured by the pixel array unit 21 according to magnitudes based on the blurring amount supplied from the blurring amount calculating unit 34 in step S14 and the blurring amount supplied from the blurring amount retaining unit 35 in step S15. When the blurring process unit 36 outputs the output image, the process is ended, and after waiting until the images of the next one frame are supplied, the same process is repeatedly performed.

As described above, in the solid-state imaging device 11, the main subject is specified by the main subject specifying unit 31, and the background area is recognized by the background area learning unit 33, so that the image process of generating the output image where a desired subject is focused and the background and the foreground are blurred can be performed at a higher speed.

<Second Embodiment of Solid-State Imaging Device>

Figure 4:
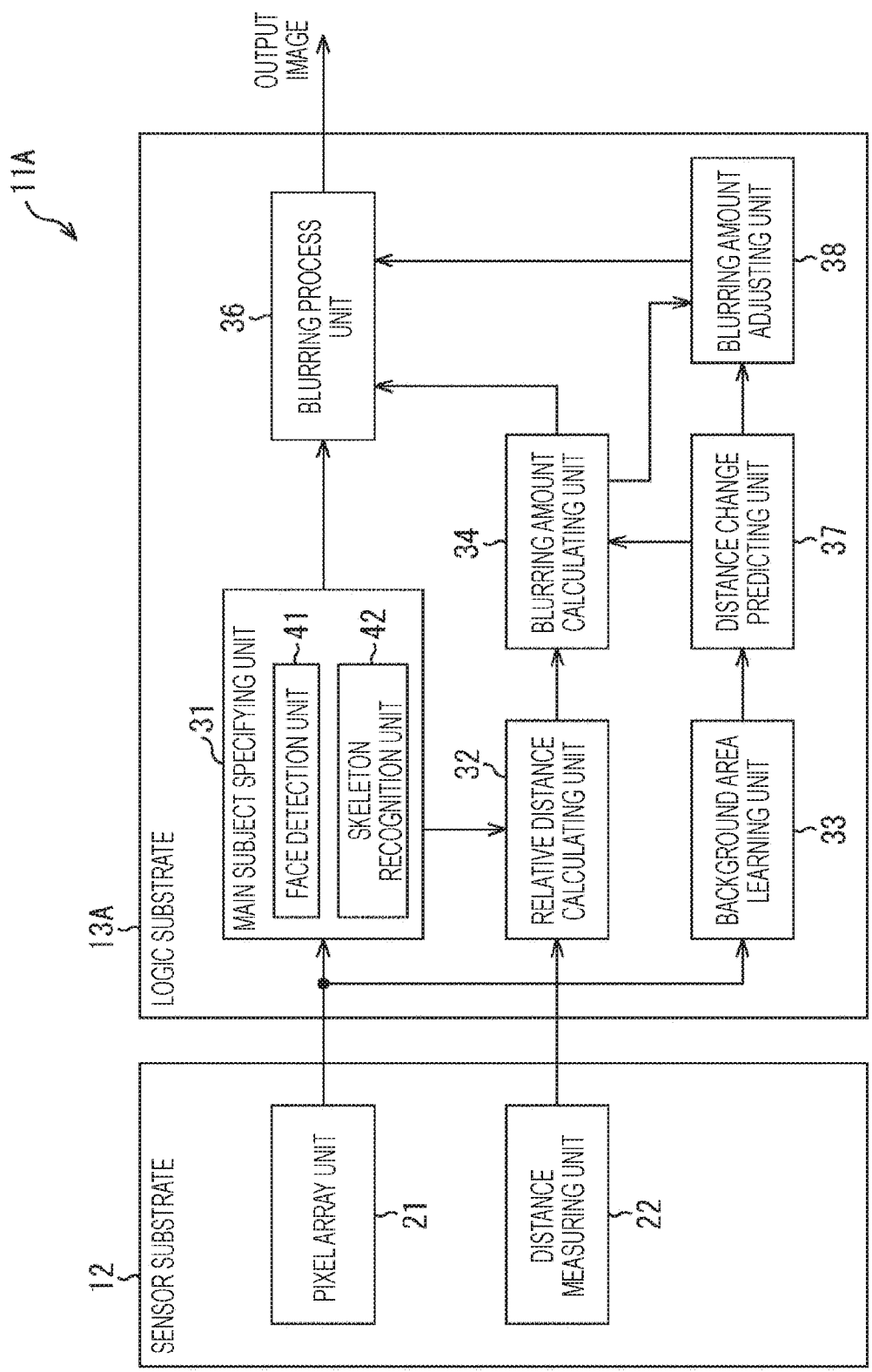
FIG. 4 is a block diagram illustrating a configuration example of a second embodiment of a solid-state imaging device.

Next, FIG. 4 is a block diagram illustrating a configuration example of a second embodiment of a solid-state imaging device. In FIG. 4, among blocks constituting a solid-state imaging device 11A, the same blocks as those of the solid-state imaging device 11 of FIG. 1 are denoted by the same reference numerals, and detailed description thereof is omitted.

Namely, the solid-state imaging device 11A is configured by stacking a sensor substrate 12 and a logic substrate 13A, and similarly to FIG. 1, the sensor substrate 12 is configured to include a pixel array unit 21 and a distance measuring unit 22.

Similarly to the logic substrate 13 of FIG. 1, the logic substrate 13A is configured to include a main subject specifying unit 31, a relative distance calculating unit 32, a background area learning unit 33, a blurring amount calculating unit 34, and a blurring process unit 36 and to further include a distance change predicting unit 37, and a blurring amount adjusting unit 38.

In the case where the solid-state imaging device 11 is not fixed but moved, the distance change predicting unit 37 predicts a change of relative distance information of a background area based on the relative distance information of the background areas of images of a plurality of frames before a process-target frame. For example, in the case where an amount of change of the relative distance information of the background areas in the images of the plurality of frames is constant, the distance change predicting unit 37 predicts the relative distance information of the background area of the process-target frame according to the amount of change.

Similarly to the blurring amount retaining unit 35 of FIG. 1, the blurring amount adjusting unit 38 supplies the blurring amount adjusted according to the change of the relative distance information of the background area predicted by the distance change predicting unit 37 to the blurring process unit 36 as well as the blurring amount adjusting unit retains the blurring amount of the background area. For example, in the case where the distance change predicting unit 37 predicts that there is no change in the relative distance information of the background area, similarly to the blurring amount retaining unit 35 of FIG. 1, the blurring amount adjusting unit 38 supplies the retained blurring amount as it is to the blurring process unit 36.

In the solid-state imaging device 11A having the above-described configuration, in the case where the solid-state imaging device 11A is not fixed but moved, the distance change predicting unit 37 predicts the change of the relative distance information of the background area, and the blurring amount adjusting unit 38 can adjust the blurring amount according to the change. Therefore, it may be avoided that the calculation of the blurring amount by the blurring amount calculating unit 34 is performed for every frame, and thus, the image process in the logic substrate 13A can be performed at a higher speed.

<Third Embodiment of Solid-State Imaging Device>

Figure 5:
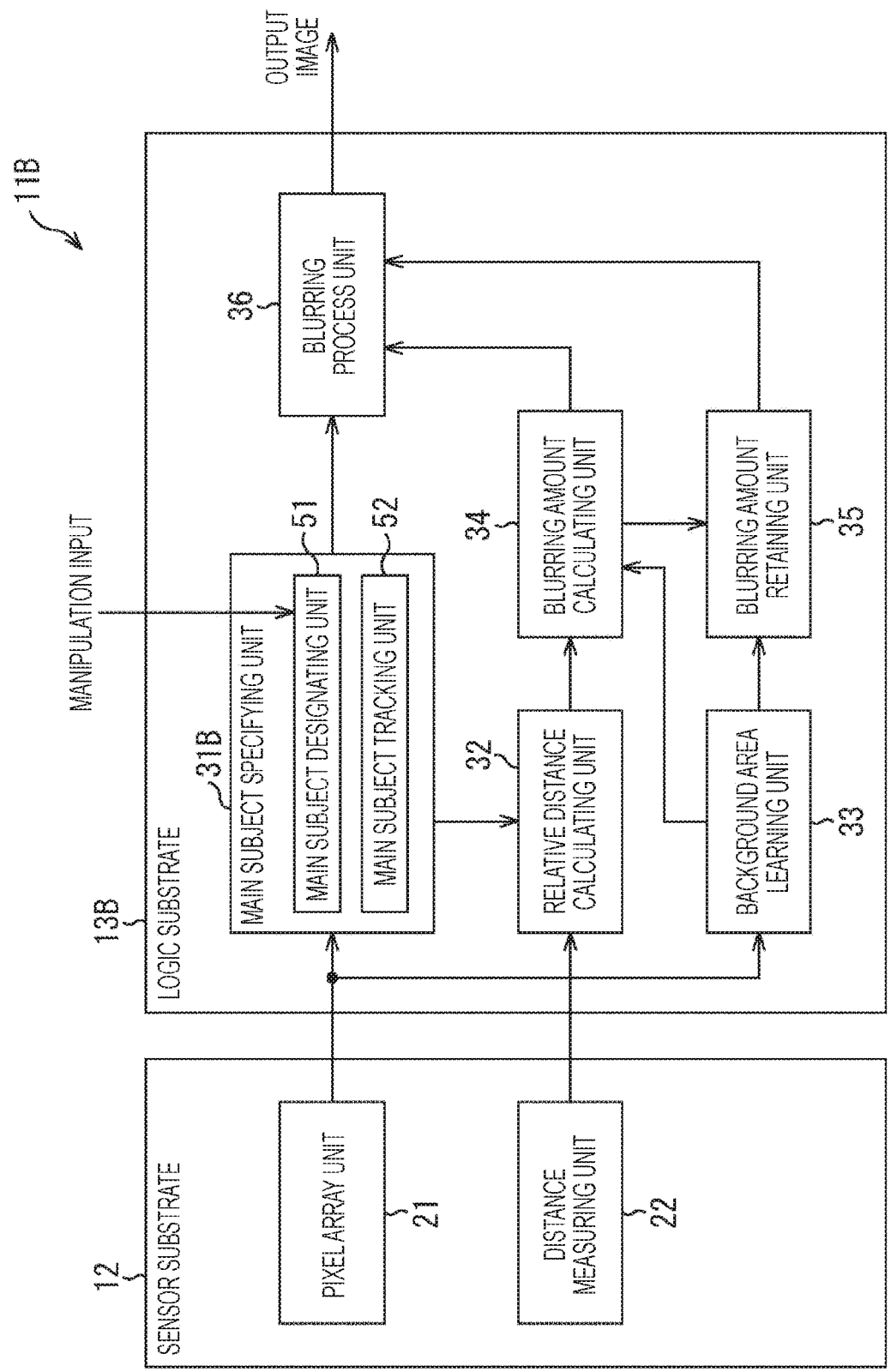
FIG. 5 is a block diagram illustrating a configuration example of a third embodiment of a solid-state imaging device.

Next, FIG. 5 is a block diagram illustrating a configuration example of a third embodiment of a solid-state imaging device. In FIG. 5, among blocks constituting a solid-state imaging device 11B, the same blocks as those of the solid-state imaging device 11 of FIG. 1 are denoted by the same reference numerals, and detailed description thereof is omitted.

Namely, the solid-state imaging device 11B is configured by stacking a sensor substrate 12 and a logic substrate 13B, and similarly to FIG. 1, the sensor substrate 12 is configured to include a pixel array unit 21 and a distance measuring unit 22.

Similarly to the logic substrate 13 of FIG. 1, the logic substrate 13B is configured to include a relative distance calculating unit 32, a background area learning unit 33, a blurring amount calculating unit 34, a blurring amount retaining unit 35, and a blurring process unit 36 and to further include a main subject specifying unit 31B. Namely, unlike the configuration of the logic substrate 13 of FIG. 1, the logic substrate 13B is configured to include a main subject specifying unit 31B as a substitute for the main subject specifying unit 31 of FIG. 1, and the main subject specifying unit 31B is configured to include a main subject designating unit 51 and a main subject tracking unit 52.

If a user performs manipulation on a manipulation unit (not shown) (for example, if the user touches a touch panel), the main subject designating unit 51 designates a subject indicated as a main subject by the manipulation. Namely, although the main subject is specified by the face direction in the main subject specifying unit 31 of FIG. 1, in the main subject specifying unit 31B, a subject (a car, a motorcycle, or the like) other than a person may be designated as the main subject.

The main subject tracking unit 52 tracks a motion of the main subject based on a color and a shape of the main subject designated by the main subject designating unit 51 to perform a process of continuously specifying the main subject. For example, although the position of the main subject on the image is changed due to the movement of the main subject, the main subject tracking unit 52 tracks the motion of the main subject, so that the output image where the background area and the foreground area are blurred is generated based on the relative distance information using the main subject as a reference.

Similarly to the solid-state imaging device 11 of FIG. 1, in the solid-state imaging device 11B having the above-described configuration, the calculation by the blurring amount calculating unit 34 is reduced by using the blurring amount of the background area retained by the blurring amount retaining unit 35, so that the image process can be performed at a higher speed.

An image process performed by the logic substrate 13B of the solid-state imaging device 11B will be described with reference to FIG. 6.

When such an image illustrated in the upper side of FIG. 6 is captured by the pixel array unit 21, if the user indicates an arbitrary flower, the main subject designating unit 51 specifies the flower indicated by the user as the main subject. For example, in an image of the lower side of FIG. 6, the flower specified as the main subject by the main subject designating unit 51 is caught by a circle, and the relative distance calculating unit 32 calculates the relative distance information of the subject photographed on the image by using the subject distance of the main subject as a reference.

Namely, as illustrated in the image of the lower side of FIG. 6, the relative distance information of a flower existing in the lower left portion together with the flower of the main subject is obtained to be 0. In addition, the relative distance information of grassland, a mountain, the sky and the like photographed in the background area is obtained to be 5, 10, <10 (10 or more) based on the subject distances thereto. In addition, the relative distance information of a flower photographed in the foreground area in the lower right portion of the image is obtained to be −5 based on the subject distance to the flower. The solid-state imaging device 11B can generate an output image where the background area and the foreground area are blurred based on the relative distance information, Next, although the composition of the captured image is changed, since the flower specified as the main subject by the main subject tracking unit 52 is tracked, the solid-state imaging device 11B can generate an output image where the background area and the foreground area are blurred.

<Fourth Embodiment of Solid-State Imaging Device>

Figure 7:
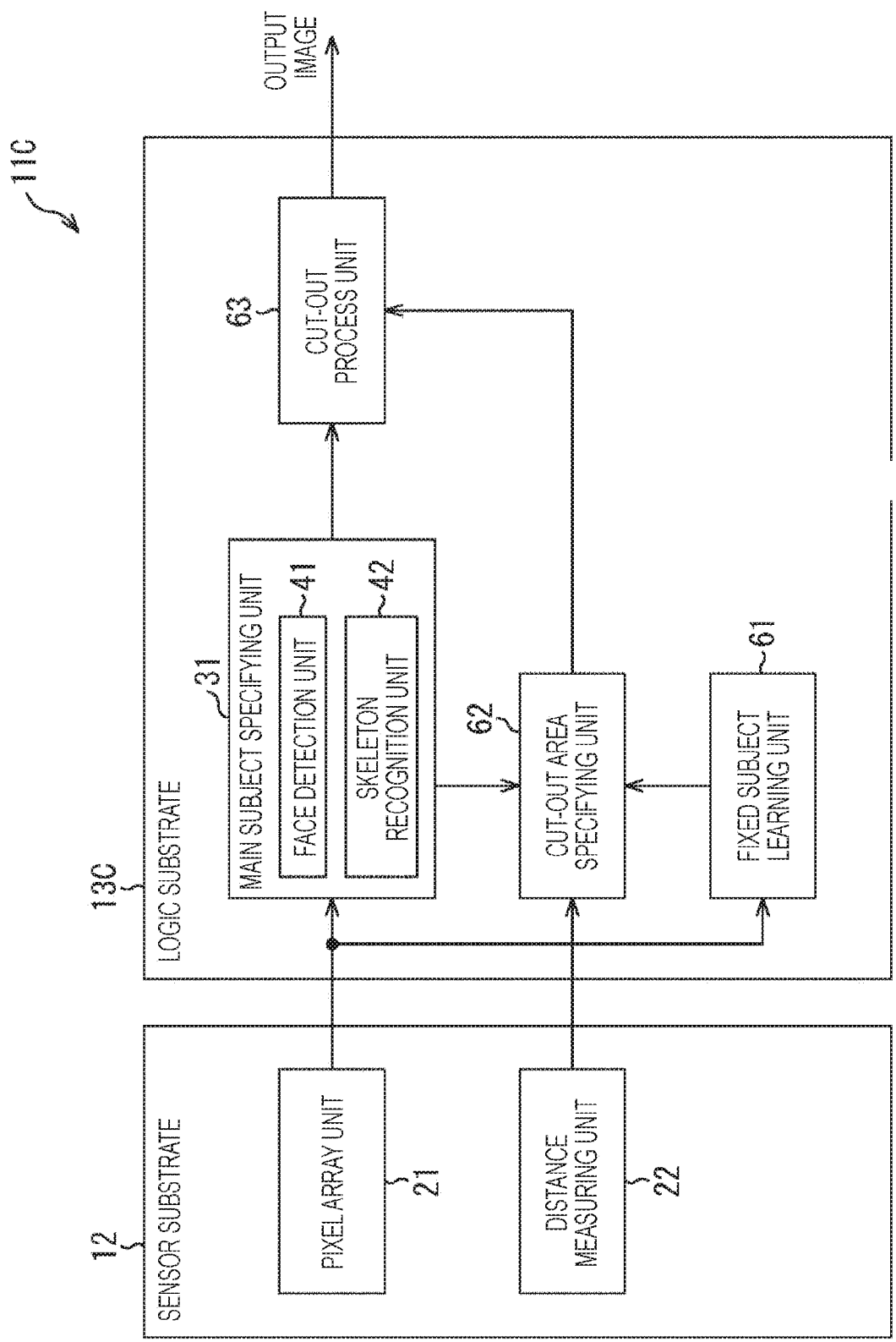
FIG. 7 is a block diagram illustrating a configuration example of a fourth embodiment of a solid-state imaging device.

Next, FIG. 7 is a block diagram illustrating a configuration example of a fourth embodiment of a solid-state imaging device. In FIG. 7, among blocks constituting a solid-state imaging device 11C, the same blocks as those of the solid-state imaging device 11 of FIG. 1 are denoted by the same reference numerals, and detailed description thereof is omitted.

Namely, the solid-state imaging device 11C is configured by stacking a sensor substrate 12 and a logic substrate 13C, and similarly to FIG. 1, the sensor substrate 12 is configured to include a pixel array unit 21 and a distance measuring unit 22.

Similarly to the logic substrate 13 of FIG. 1, the logic substrate 13C is configured to include a main subject specifying unit 31 and to further include a fixed subject learning unit 61, a cut-out area specifying unit 62, and a cut-out process unit 63.

The fixed subject learning unit 61 performs learning using a moving picture supplied from a pixel array unit 21. For example, the fixed subject learning unit recognizes an area (hereinafter, referred to as a fixed subject area) where a subject located at a fixed position in the image is photographed based on a difference between frames of the moving picture and supplies the area to the cut-out area specifying unit 62. Namely, if images of one frame are supplied from the pixel array unit 21, the fixed subject learning unit 61 obtains a motion of the subject based on a difference to the images of the preceding frame and recognizes an area where the fixed subject is photographed as the fixed subject area.

The cut-out area specifying unit 62 specifies a cut-out area for cutting out a specific subject from the image based on the main subject area specified by the main subject specifying unit 31, the subject distances over the entire surface of the image supplied from the distance measuring unit 22, and the fixed subject area recognized by the fixed subject learning unit 61. For example, the cut-out area specifying unit 62 allows the main subject area and the area where a person existing together with the main subject specified based on the subject distance is photographed to be included in the cut-out area. At this time, even in case of an object located in the distance equal to that of the main subject, the cut-out area specifying unit 62 may not allow an area recognized as the fixed subject area by the fixed subject learning unit 61 to be included in the cut-out area.

The cut-out process unit 63 performs an image process of cutting out the cut-out area specified by the cut-out area specifying unit 62 from the image captured by the pixel array unit 21 supplied through the main subject specifying unit 31. Therefore, the cut-out process unit 63 generates an output image where the main subject and the person existing together with the person of the main subject are cut out and outputs the output image to a signal processing circuit (not shown) at the rear stage thereof.

The solid-state imaging device 11C having the above-described configuration can accurately cut out a subject as a cut-out target based on both of the subject distance measured by the distance measuring unit 22 and the fixed subject area recognized by the fixed subject learning unit 61.

Herein, an image process performed by the logic substrate 13C of the solid-state imaging device 11C will be described with reference to FIG. 8.

When such an image illustrated in the upper side of FIG. 8 is captured by the pixel array unit 21, the main subject specifying unit 31 specifies a person whose face is photographed to have the largest size by the face detection unit 41 and sets the main subject area so that a body of a person specified by the skeleton recognition unit 42 is included. For example, in an image of the center of FIG. 8, the entire portion of the person specified as the main subject by the main subject specifying unit 31 is caught by a circle. Herein, the cut-out area specifying unit 62 calculates the relative distance information of the subject photographed in the image, for example, by using the distance to the subject specified firstly as the main subject as a reference distance.

Namely, as illustrated in the image of the center of FIG. 8, the relative distance information of other subjects which are located in the distance equal to that of the subject specified firstly as the main subject is obtained to be 0. In addition, the relative distance information of the subjects photographed in the background area is obtained to be 10 and <10 (10 or more) based on the subject distances to the subjects.

Herein, in the solid-state imaging device 11C, process is performed such that the distance to the subject specified firstly as the main subject is treated as a reference distance, and as illustrated in an image of the lower side of FIG. 8, it is assumed that the main subject is moved, and thus, the distance to the main subject is changed (changed from 0 to 2). At this time, if other subjects of which the relative distance information is 0 are fixed, the relative distance information of the other subjects is maintained to be 0.

Therefore, the fixed subject learning unit 61 recognizes the fixed subject area and supplies the fixed subject area to the cut-out area specifying unit 62, and thus, the cut-out area specifying unit 62 can specify the cut-out area so that other subjects located in the distance equal to that of the main subject are not included in the cut-out area. Namely, in the solid-state imaging device 11C, even in case of an object located in the distance equal to that of the main subject, if the distance information thereof is not changed for a certain time interval, the object is not recognized as a cut-out target like the background, so that cutting out of the object is not performed.

The subject as a cut-out target will be described more in detail with reference to FIG. 9.

Figure 9:
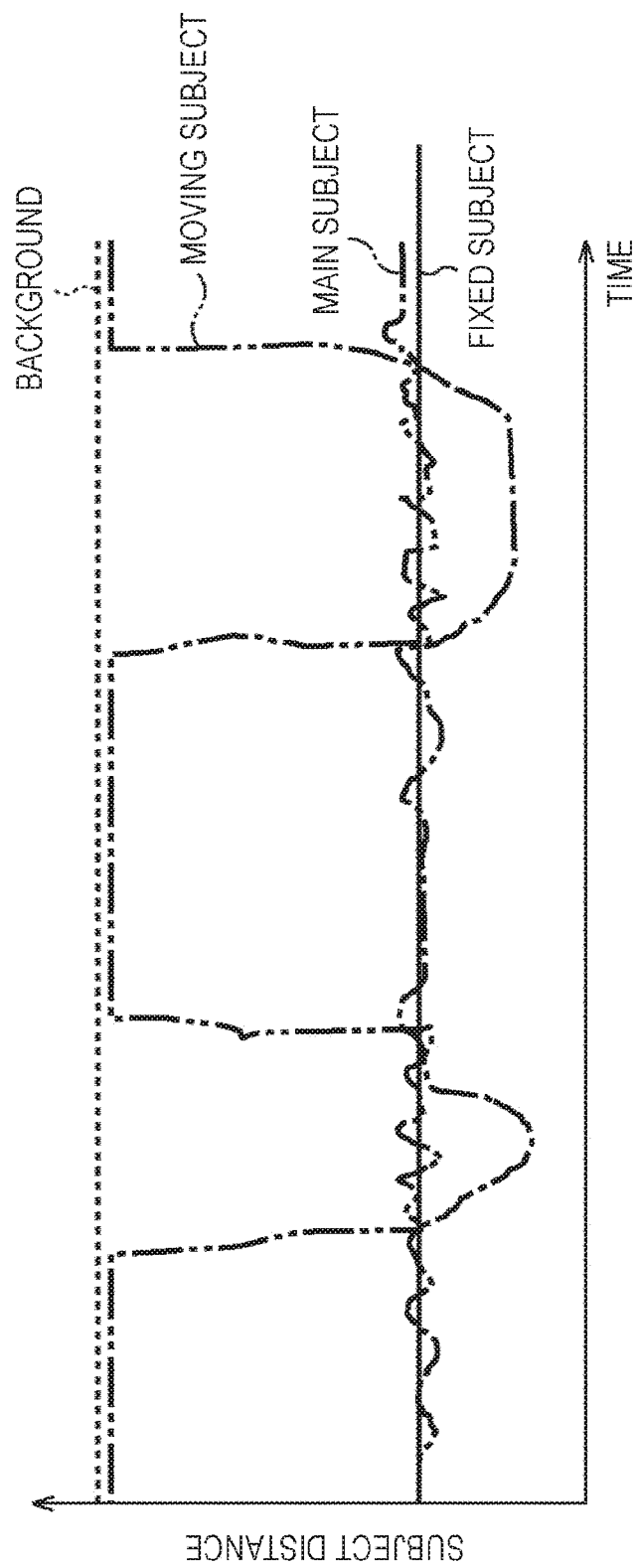
FIG. 9 is a diagram for explaining a subject as a cut-out target.

FIG. 9 is a diagram illustrating change of subject distances to background, a fixed subject, a main subject, and a moving subject, and in the figure, the vertical axis denotes a subject distance and the horizontal axis denotes a time.

In the solid-state imaging device 11C, the background and the fixed subject to which the subject distance are constant and the main subject and the moving subject to which the subject distance is variable can be separated from each other based on the subject distances illustrated in FIG. 9, and only the main subject and the moving subject can be cut out. Namely, in the solid-state imaging device 11C, by cutting out only the pixels to which the subject distance is in the vicinity of the main subject and which are fluctuated with respect to the time elapse within a predetermined range from the reference distance, the main subject and the moving subject which is moved to the vicinity of the main subject can be accurately cut out.

For example, in case of performing an image process of cutting out only the moving subject through image analysis of background difference or the like, since the image process is easily influenced by illumination change, shadows, or the like, it is difficult to accurately cut out the subject. In addition, in case of cutting out a subject based on only subject distance information, since an object located in the distance equal to that of the subject is cut out, it is difficult to accurately cut out only a person as a cut-out target.

On the contrary, as described above, in the solid-state imaging device 11C, since the cut-out area specifying unit 62 uses the subject distance and does not allow the fixed subject area recognized by the fixed subject learning unit 61 to be included in the cut-out area, it is possible to accurately cut out only the moving subject.

In addition, in the above-described embodiments, in the solid-state imaging device 11, although the calculation of obtaining the blurring amount is performed for every one frame of the moving picture, for example, in the case where the motion of the subject photographed in the image is small, the calculation of obtaining the blurring amount may be performed for every several frames. In addition, the present technology can be applied to image processes other than the processes such as the blurring process in the solid-state imaging device 11 or the cut-out process in the solid-state imaging device 11C.

In addition, the processes described with reference to the above-described flowchart are not necessarily performed in time series according to the order disclosed in the flowchart, and the processes may include process (for example, parallel processes or object-based processes) performed in parallel or individually. In addition, a program may be executed by a single CPU or may be executed by a plurality of CPUs in a distributed processing manner.

In addition, a series of processes described above may be performed in a hardware manner or a software manner. In case of performing a series of processes in a software manner, a program constituting the software may be installed in a computer incorporated into dedicated hardware, a general-purpose computer where various programs are installed to be capable of executing various functions, or the like from a program recording medium where the program is recorded.

<Configuration Example of Electronic Apparatus>

In addition, the solid-state imaging device 11 according to each embodiment described above may be applied to various electronic apparatuses, for example, imaging systems such as a digital still camera or a digital video camera, mobile phones having an imaging function, or other apparatuses having an imaging function.

Figure 10:
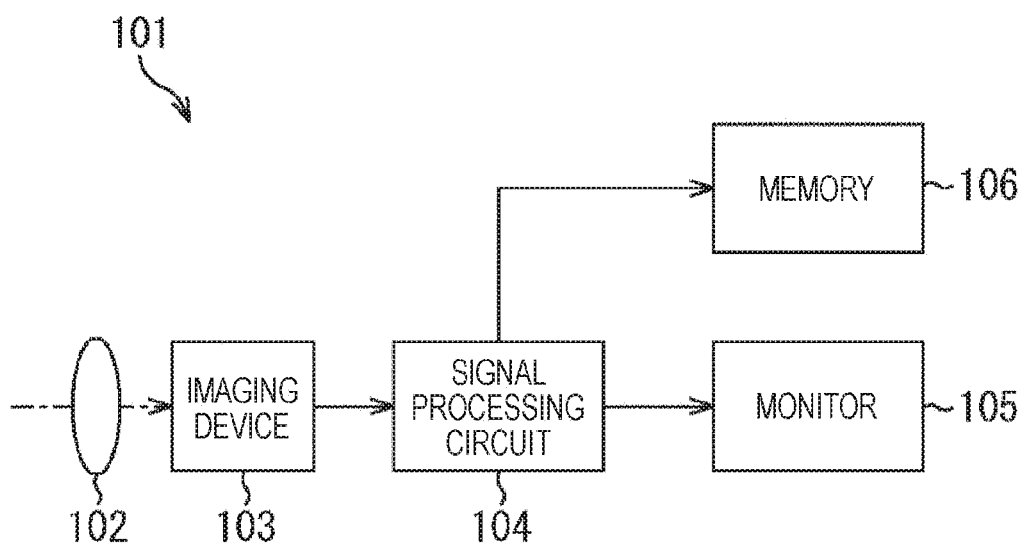
FIG. 10 is a block diagram illustrating a configuration example of an embodiment of an electronic apparatus according to an aspect of the present technology.

FIG. 10 is a block diagram illustrating a configuration example of an imaging apparatus equipped in an electronic apparatus.

As illustrated in FIG. 10, an imaging apparatus 101 is configured to include an optical system 102, an imaging device 103, a signal processing circuit 104, a monitor 105, and a memory 106 and is capable of capturing a still image and a moving picture.

The optical system 102 is configured to include one lens or a plurality of lenses and guides image light (incident light) from a subject to the imaging device 103 to form an image on a light-receiving surface (sensor unit) of the imaging device 103.

As the imaging device 103, the solid-state imaging device 11 according to above-described each embodiment is employed. Electrons are accumulated in the imaging device 103 for a certain time interval according to the image formed on the light-receiving surface through the optical system 102. A signal according to the electrons accumulated in the imaging device 103 is supplied to the signal processing circuit 104.

The signal processing circuit 104 applies various signal processes to the pixel signal output from the imaging device 103. An image (image data) obtained by adding the signal process in the signal processing circuit 104 is supplied to the monitor 105 to be displayed or is supplied to the memory 106 to be stored (recorded).

In the imaging apparatus 101 having such a configuration, since the solid-state imaging device 11 according to the above-described each embodiment is employed, for example, an image where background and foreground are effectively blurred can be previewed in real time.

<Use Example of Image Sensor>

FIG. 11 is a diagram illustrating use examples using the above-described image sensor (solid-state imaging device 11).

The above-described image sensor can be used in various cases of sensing light such as visible light, infrared light, ultraviolet light, or X-rays, for example, as follows.

- Apparatuses capturing images provided for the use in appreciation such as a digital camera or a mobile apparatus with a camera function
- Apparatuses provided for the use in traffic such as an on-vehicle sensor imaging front and rear sides, surroundings, inside of a vehicle, a surveillance camera monitoring running vehicles and roads, or a distance measuring sensor measuring distances between vehicles for the purpose of safe driving such as automatic stop or recognition of driver's state or the like.
- Apparatuses provided to home appliance such as a TV set, a refrigerator, or an air-conditioner to image user's gesture and manipulate the home appliance according to the gesture
- Apparatuses provided for the use in medical care or health care such as an endoscope or an apparatus performing angiography by receiving infrared light
- Apparatuses provided for the use in security such as a surveillance camera for crime prevention or a camera for person authentication
- Apparatuses provided for the use in beauty such as a skin measurement instrument imaging skin or a microscope imaging scalp
- Apparatuses provided for the use in sports such as an action camera dedicated to sports applications or a wearable camera
- Apparatuses provided for the use in agriculture such as a camera for monitoring states of fields or crops In addition, the present technology may be configured as below.

An image processing device may comprise a storage device configured to store a first image and a second image captured at different times, wherein the first image and the second image include a same object, and a computer processor programmed to determine a location of a first area in the first image, wherein the first area includes the object, determine a location of a second area in the second image, wherein the second area includes the object, and determine a new background area in the second image based on the location of the first area and the location of the second area, wherein the new background area includes a portion of the second image included in the first area but not included in the second area.

The computer processor may be further programmed to determine an excluded background area in the second image based on the location of the first area and the location of the second area, wherein the excluded background area includes a portion of the second image included in the second area but not included in the first area.

The computer processor may be further programmed to reduce blurring within the excluded background area of the second image.

The computer processor may be further programmed to perform image processing within the new background area of the second image, wherein performing imaging processing may further comprise calculating a blurring amount for a portion of the second image within the new background area, and performing blurring within the new background area of the second image based on the calculated blurring amount.

The computer processor may be further programmed to receive distance information indicating a distance between an imaging device used to capture the second image and the object, and wherein calculating the blurring amount for a portion of the second image within the new background area comprises calculating the blurring amount based, at least in part, on the received distance information.

Calculating the blurring amount based, at least in part, on the received distance information may further comprise determining a relative distance between at least one object in the new background area and the object in the second area, and calculating the blurring amount based, at least in part, on the relative distance.

The distance information may be determined using a technique selected from the group consisting of a phase difference analysis, a stereo camera analysis, and a light reflection analysis.

The computer processor may be further programmed to determine a location of a background area in the first image as a portion of the first image other than the first area, calculate a blurring amount for the background area in the first image, store the blurring amount, and perform blurring within the background area of the first image based on the calculated blurring amount.

The computer processor may be further programmed to determine a location of a continual background area in the second image as a portion of the second image other than the second area and the new background area, and perform blurring within the continual background area of the second image based, at least in part, on the stored blurring amount.

The computer processor may be further programmed to predict, from the first image to the second image, a change in distance between an imaging device used to capture the second image and one or more objects in the continual background area of the second image, and perform blurring within a portion of the second image based, at least in part, on the predicted change in distance.

The computer processor may be further programmed to determine the location of a first area in the first image using a detection technique selected from the group consisting of face detection, edge detection, and input from a user of the device.

The first image and the second image may be consecutive frames of recorded video.

The first image and the second image may be still images.

An image processing method may comprise determining, by at least one computer processor, a location of a first area in a first image, determining in a second image captured at a different time than the first image, a location of a second area, wherein the first area and the second area include a same object, and determining a new background area in the second image based on the location of the first area and the location of the second area, wherein the new background area includes a portion of the second image included in the first area but not included in the second area.

The image processing method may further comprise determining an excluded background area in the second image based on the location of the first area and the location of the second area, wherein the excluded background area includes a portion of the second image included in the second area but not included in the first area, and reducing blurring within the excluded background area of the second image.

The image processing method of claim 14, may further comprise performing image processing within the new background area of the second image, wherein performing imaging processing comprises calculating a blurring amount for a portion of the second image within the new background area, and blurring a portion of the second image within the new background area based on the calculated blurring amount.

Calculating the blurring amount for a portion of the second image within the new background area may comprise calculating the blurring amount based, at least in part, on distance information indicating a distance between an imaging device used to capture the second image and the object.

The image processing method may further comprise determining a location of a continual background area in the second image as a portion of the second image other than the second area and the new background area, and performing blurring within the continual background area of the second image based, at least in part, on a stored blurring amount used to blur a background area of the first image.

An image capturing system may comprise an image sensor configured to convert incident light to an electronic signal to form image data, at least one lens arranged to focus incident light onto a light-incident surface of the image sensor, and signal processing circuitry arranged to receive the image data from the image sensor and configured to process the image data. The signal processing circuitry may comprise a storage device configured to store a first image and a second image received from the image sensor, wherein the first image and the second image include a same object, and a computer processor programmed to determine a location of a first area in the first image, wherein the first area includes the object, determine a location of a second area in the second image, wherein the second area includes the object, and determine a new background area in the second image based on the location of the first area and the location of the second area, wherein the new background area includes a portion of the second image included in the first area but not included in the second area.

The image sensor may be a stacked complementary metal oxide semiconductor (CMOS) image sensor.

The embodiments are not limited to the above-described embodiments, but various changes are available within the scope without departing from the spirit of the present disclosure.

REFERENCE SIGNS LIST

11 Solid-state imaging device
12 Sensor substrate
13 Logic substrate
21 Pixel array unit
22 Distance measuring unit
31 Main subject specifying unit
32 Relative distance calculating unit
33 Background area learning unit
34 Blurring amount calculating unit
35 Blurring amount retaining unit
36 Blurring process unit
37 Distance change predicting unit
38 Blurring amount adjusting unit
41 Face detection unit
42 Skeleton recognition unit
51 Main subject designating unit
52 Main subject tracking unit
61 Fixed subject learning unit
62 Cut-out area specifying unit
63 Cut-out process unit

The invention claimed is:

1. An image processing device, comprising:
a storage device configured to store a first image and a second image, wherein the first image and the second image are captured by an imaging device, the first image and the second image are captured at different times, and the first image and the second image include a first object; and
a processor configured to:
  determine a first location of a first area in the first image, wherein the first area includes the first object;
  determine a second location of a second area in the second image, wherein the second area includes the first object;
  determine a new background area in the second image based on the first location of the first area and the second location of the second area, wherein
    the new background area includes a first portion of the second image, and
    the first portion is included in the first area and excluded from the second area;
  determine a relative distance between a second object in the second image and the first object in the second area,
    wherein the determined relative distance is a positive value when the second object is in a background of the first object, and the determined relative distance is a negative value when the second object is in a foreground of the first object;

determine an excluded background area in the second
image based on the first location of the first area and
the second location of the second area, wherein
the excluded background area includes a second
portion of the second image, and
the second portion is included in the second area and
excluded from the first area;
determine, from the first image to the second image, a
change in a distance between the imaging device and
a third object, wherein
the third object is in a continual background area of
the second image,
the continual background area is a third portion of
the second image, and
the third portion is different from the second area and
the new background area;
blur the excluded background area of the second image
based on the relative distance; and
blur the continual background area of the second image
based on the determined change in the distance.

2. The image processing device of claim 1, wherein
the processor is further configured to:
execute image processing within the new background
area of the second image,
wherein, in the image processing, the processor is
further configured to:
calculate a blurring amount for a fourth portion of
the second image, wherein the fourth portion is
within the new background area; and
blur the new background area of the second image
based on the calculated blurring amount.

3. The image processing device of claim 2, wherein the
processor is further configured to:
receive distance information, wherein the distance information indicates a distance between the imaging device
and the first object; and
calculate the blurring amount for the fourth portion of the
second image based on the received distance information.

4. The image processing device of claim 3, wherein the
processor is further configured to determine the distance
information based on at least one of a phase difference
analysis, a stereo camera analysis, or a light reflection
analysis.

5. The image processing device of claim 1, wherein the
processor is further configured to:
determine a third location of a background area in the first
image, wherein the background area in the first image
is a portion of the first image different from the first
area;
calculate a blurring amount for the background area in the
first image;
store the calculated blurring amount; and
blur the background area of the first image based on the
stored blurring amount.

6. The image processing device of claim 5, wherein the
processor is further configured to:
determine a fourth location of the continual background
area in the second image; and
blur the continual background area of the second image
based on the stored blurring amount.

7. The image processing device of claim 1, wherein the
processor is further configured to determine the first location
of the first area in the first image based on at least one of face
detection, edge detection, or input from a user of the image
processing device.

8. The image processing device of claim 1, wherein the
first image and the second image are consecutive frames of
a recorded video.

9. The image processing device of claim 1, wherein the
first image and the second image are still images.

10. An image processing method, comprising:
determining, by at least one processor, a first location of
a first area in a first image;
determining, by the at least one processor, a second
location of a second area in a second image, wherein
the first image and the second image are captured by an
imaging device,
the first image and the second image are captured at
different times, and
the first area and the second area include a first object;
determining, by the at least one processor, a new background area in the second image based on the first
location of the first area and the second location of the
second area, wherein
the new background area includes a first portion of the
second image, and
the first portion is included in the first area and
excluded from the second area;
determining, by the at least one processor, a relative
distance between a second object in the second image
and the first object in the second area,
wherein the determined relative distance is a positive
value when the second object is in a background of
the first object, and the determined relative distance
is a negative value when the second object is in a
foreground of the first object;
determining, by the at least one processor, an excluded
background area in the second image based on the first
location of the first area and the second location of the
second area, wherein
the excluded background area includes a second portion of the second image, and
the second portion is included in the second area and
excluded from the first area;
determining, by the at least one processor, a change in a
distance between the imaging device and a third object,
wherein
the third object is in a continual background area of the
second image,
the change in the distance is determined from the first
image to the second image,
the continual background area is a third portion of the
second image, and
the third portion is different from the second area and
the new background area;
blurring the excluded background area of the second
image based on the relative distance; and
blurring the continual background area of the second
image based on the determined change in the distance.

11. The image processing method of claim 10, further
comprising:
executing image processing within the new background
area of the second image, wherein
the execution of the image processing comprises:
calculating a blurring amount for a fourth portion of the
second image,
wherein the fourth portion is within the new background
area; and
blurring the fourth portion of the second image based
on the calculated blurring amount.

12. The image processing method of claim 11, further comprising:
calculating the blurring amount based on distance information, wherein the distance information indicates a distance between the imaging device and the first object.

13. The image processing method of claim 10, further comprising:
determining a third location of the continual background area in the second image; and
blurring the continual background area of the second image based on a stored blurring amount used to blur a background area of the first image.

14. An image capturing system, comprising:
an image sensor configured to convert incident light to an electronic signal, wherein the electronic signal corresponds to image data;
at least one lens configured to focus the incident light onto a light-incident surface of the image sensor; and
signal processing circuitry configured to:
receive the image data from the image sensor; and
process the image data, wherein the signal processing circuitry comprises:
a storage device configured to store a first image and a second image received from the image sensor, wherein
the first image and the second image correspond to the image data, and
the first image and the second image include a first object; and
a processor configured to:
determine a first location of a first area in the first image, wherein the first area includes the first object;
determine a second location of a second area in the second image, wherein the second area includes the first object;
determine a new background area in the second image based on the first location of the first area and the second location of the second area, wherein
the new background area includes a first portion of the second image, and
the first portion is included in the first area and excluded from the second area;
determine a relative distance between a second object in the second image and the first object in the second area,
wherein the determined relative distance is a positive value when the second object is in a background of the first object, and the determined relative distance is a negative value when the second object is in a foreground of the first object;
determine an excluded background area in the second image based on the first location of the first area and the second location of the second area, wherein
the excluded background area includes a second portion of the second image, and
the second portion is included in the second area and excluded from the first area;
determine, from the first image to the second image, a change in a distance between the image sensor and a third object, wherein
the third object is in a continual background area of the second image,
the continual background area is a third portion of the second image, and
the third portion is different from the second area and the new background area;
blur the excluded background area of the second image based on the relative distance; and
blur the continual background area of the second image based on the determined change in the distance.

15. The image capturing system of claim 14, wherein the image sensor is a stacked complementary metal oxide semiconductor (CMOS) image sensor.

* * * * *